(No Model.)
J. J. HARRELL.
GAS METER.
No. 398,721. Patented Feb. 26, 1889.
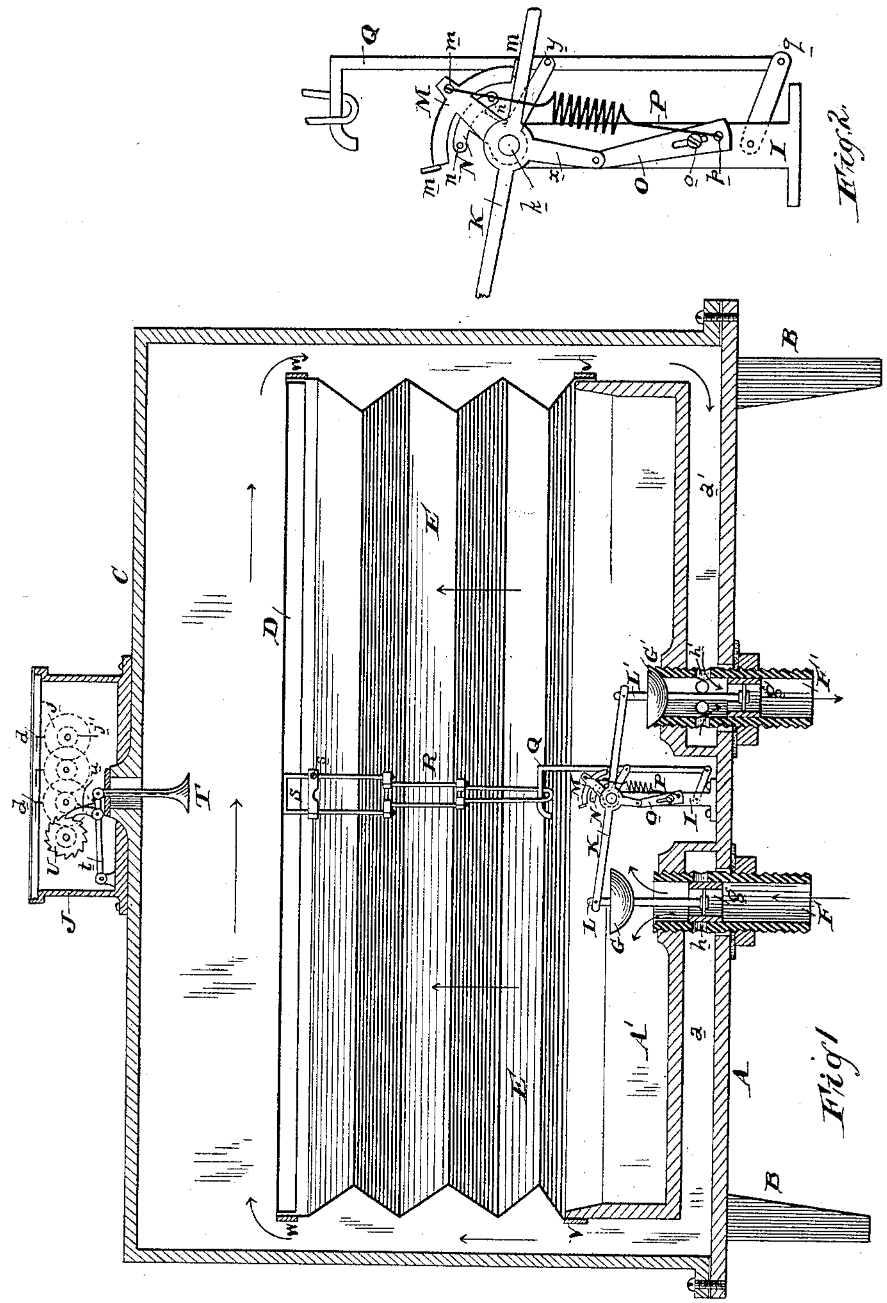
WITNESSES:
C. W. Benjamin.
Geo. H. Conneborn
INVENTOR.
Joseph J. Harrell
BY
John R. Bennett
ATTORNEY.
N. PETERS. Photo-Lithographer, Washington, D. C.

UNITED STATES PATENT OFFICE.

JOSEPH J. HARRELL, OF NEW BRIGHTON, PENNSYLVANIA, ASSIGNOR TO JOHN H. LOGAN, TRUSTEE, OF SAME PLACE.

GAS-METER.

SPECIFICATION forming part of Letters Patent No. 398,721, dated February 26, 1889.

Application filed August 28, 1888. Serial No. 284,040. (No model.)

*To all whom it may concern:*

Be it known that I, JOSEPH J. HARRELL, of the city of New Brighton, county of Beaver, and State of Pennsylvania, have invented a new and useful Improvement in Gas-Meters, of which the following is a specification, and shown in the accompanying drawings, which form part thereof.

My invention has particular reference to gas-meters in which the amount of gas passed through it is registered; but it is equally well adapted to meters where it is simply necessary to insure the proper amount of gas being delivered without keeping any record.

In carrying out my invention I provide a bellows with an inlet and an outlet pipe and suitable valves to automatically admit gas to the bellows and allow of its escape therefrom alternately, the said valves being operated by the movements of the bellows through the medium of a suitable trip device, which is adapted first to shift the valves and then hold them temporarily in their newly-assumed positions. The bellows may or may not operate a registering device, as desired. In connection with the said bellows I prefer to employ a gas-tight chamber, in which it expands and contracts, and to this chamber and on the outside of the bellows I admit gas to cause the bellows to collapse and force out the gas contained within it. The gas is admitted to the chamber through a suitable valve and from it through any valve opening into the outlet-pipe, and these second valves are actuated by the same mechanism that operates the valves controlling the flow of gas to the bellows. They are so arranged that when the gas is entering the bellows it is escaping from the chamber outside of the bellows, and vice versa, whereby the pressure of the gas may not only expand the bellows, but also cause it to be compressed.

It is evident that the employment of the gas-pressure to the outside of the bellows is to force the gas into the main (where the gas is to be used) against the pressure in said main, and it is apparent that if the pressure in said main is inconsiderable the bellows may be so weighted by the construction that they will have sufficient power to expel the gas into the said main, where it will exist at a much lower pressure than that in the main leading to the gas-works. The trip may be so adjusted as to vary the amount of gas expelled at each movement of the bellows, so as to make the register correct.

The particular mechanism employed is of second importance, and that shown is thought to be well adapted to the purpose of this invention; but I do not limit myself to the details therein shown.

In the drawings, Figure 1 is a sectional elevation of a gas-meter embodying my invention, and Fig. 2 is an enlarged view of the trip mechanism shown therein.

A is the base of the chamber and may have supporting-feet B. To this base is bolted the upper part, C, of the chamber. Secured to or cast integral with the lower part of the chamber is the bottom A' of the bellows. To this the flexible or expanding part E of the bellows is secured, and to the upper of said part is the covering or top D. This flexible portion of the bellows is connected to the top and bottom by any suitable gas-tight joints, W V. As the bellows rises and falls it operates the downwardly-extending arm T, which, through the medium of lever $t$, a pawl, $u$, and gears U $j$ $j'$, operates the pointers $d$ of the registering device J. Gas is supplied to the interior of the bellows by an inlet-pipe, F, and to the chamber outside of the bellows by means of the ports $h$ and passage-way $a$. The gas is passed off from the bellows by pipe F' and from the chamber exterior to the bellows by the passage-way $a'$ and outlet-ports $h'$. The gas passing to the bellows is controlled by a valve, G, on pipe F, and from the bellows by a valve, G', on pipe F'. Likewise, the gas admitted to the chamber outside of the bellows is controlled by a valve, $g$, governing the ports $h$, and from said chamber by the valve $g'$, governing the ports $h'$. The valves G and $g$ are connected together by rod L, and so are the valves G' and $g'$ by rod L', and these two rods L L' are hinged to the respective ends of the lever K, pivoted at its center, $k$, to a standard, I, located within the bellows. Also pivoted upon the same fulcrum is a loose arm, M, having a segment with stops $m$ at its ends, which, when the segment is thrown in either direction, press down upon the valve-lever K to hold it in its assumed position.

Pivoted to a projecting arm, $x$, of the lever K is a loose pivoted lever, O, pivoted at $o$ to standard I and having its lower end connected with the top of the arm M by a spring, P. The result of this construction is apparent, (see Fig. 2,) for the action of the spring on the lever O is to tilt the valve-lever K and also the arm M, both the lever O and the arm M acting to hold the valve-lever K in its assumed position, closing either the valve G or G′. Which valve is held down by the spring depends upon which side of the fulcrum $k$ of valve-lever K the said spring operates.

N is a trip-lever, also fulcrumed at $k$, and has pins $n$ $n$ arranged at a distance apart and acting upon opposite sides of the arm M, so as to cause it to oscillate. The trip-lever is connected at $y$ to a vertical rod, Q, also preferably connected at its bottom to the standard by a link, $q$. Now, it is evident that if the rod Q be pulled up it will cause the trip-lever N to be oscillated, making the pin $n$ strike the arm M and throw it to the left, causing the spring P to act on the other side of the fulcrum $k$. This in turn causes the lever K to be quickly oscillated, lifting valves G′ $g'$ and lowering the valves G and $g$, changing the movements of the gas. The reciprocations of the rod Q or the lever $n$ cause the valves to be operated in opposite directions simultaneously. This rod Q may be moved in any manner desired, but, as shown, is connected by a loose chain, R, with the top of the bellows, and when the bellows moves up and about reaches its upward limit the links of the chain are taut and act upon the rod Q to lift it up. In descending, the bellows collapse and the links of the chain R are lowered. A striker, S, is adjustably secured to the upper link by a set-screw, $s$, or otherwise, and in descending strikes the rod Q, causing it to be thrust down, reversing the action of the valves through the medium of the trip mechanism. (Shown in Fig. 2.) By adjusting the striker S up or down on the upper link or other suitable projection from the top of the bellows the time of action of the trip mechanism can be made to vary to increase or decrease the capacity of the meter with a given number of reciprocations. The various devices and details of construction may be varied or modified with the same results in operation.

In operation the valves G $g$ rise and valves G′ $g'$ descend for the upward movement of the bellows, and vice versa. While the valve G admits gas to the bellows, the valve $g'$ allows gas to escape from the chamber around the bellows through ports $h'$ into the pipe F′, and when gas is escaping from the bellows by raising valve G′ the valve $g$ will be moved to allow gas to enter the chamber around the bellows by ports $h$. In this manner the gas-pressure is made to act alternately upon opposite sides of the bellows and is the power which operates it. It is evident that by making the top D of the bellows heavy and supplying gas from pipe F at considerable pressure and discharging it into a pipe, F′, at lower pressure, the apparatus could be made to operate successfully without valves $g$ $g'$ and ports $h$ $h'$; but this would only be for special uses.

Having now described my invention, what I claim as new, and desire to secure by Letters Patent, is—

1. In a meter, the combination, with an outer case, of a bellows which divides the meter into an inner or bellows chamber and an outer or case chamber, a bellows-bottom arranged within the outer case and having passages which lead into and from the case-chamber, as at $a$ $a'$, inlet and outlet pipes which extend through the case and the bellows-bottom and are provided with ports which connect with the passages leading to the case-chamber, as at $h$ $h'$, and valves for controlling said pipes and their ports, substantially as and for the purposes specified.

2. In a meter, the combination, with an outer case, of a bellows arranged therein, and which divides the meter into an inner or bellows chamber and an outer or case chamber, a bellows-bottom, inlet and outlet pipes which pass through the case and bellows-bottom, said pipes having ports which connect with the case-chamber, and sleeve-valves arranged in said pipes and connected with each other and with the bellows, so as to be simultaneously and reversely operated, substantially as and for the purposes specified.

3. In a meter, the combination, with an outer case, of a bellows arranged therein and which divides the meter into an inner or bellows chamber and an outer or case chamber, inlet and outlet pipes which pass through the outer case and into the bellows, said pipes provided with ports which connect with the outer or case chamber, puppet-valves which control the pipes, and sleeve-valves which control the ports in said pipes, said several valves connected with each other and with the bellows, substantially as and for the purposes specified.

4. In a meter, the combination of a bellows, a gas-inlet pipe to admit gas to said bellows, a pipe to allow gas to escape from said bellows, a valve for each of said pipes, a connection between said valves, whereby one closes when the other opens, and trip mechanism operated by the bellows to actuate said valves to alternately admit gas to the bellows and allow it to escape therefrom, said trip mechanism and valves being located wholly within the bellows.

5. The combination of a bellows, pipes to admit gas to and from the bellows, a registering device operated by the bellows, valves for gas inlet and outlet, a pivoted valve-lever connecting said valves, so as to open one simultaneously with the closing of the other, and vice versa, a pivoted arm to press on the lever upon either side of its fulcrum, a spring acting upon said pivoted arm to hold it against the lever, a trip-lever adapted to shift said arm, and a flexible connection between the trip-lever and the bellows, whereby the movements of the bellows alternately operate the valves.

6. The combination of a bellows, pipes to admit gas to and from the bellows, a registering device operated by the bellows, valves for gas inlet and outlet, a pivoted valve-lever connecting said valves, so as to open one simultaneously with the closing of the other, and vice versa, a pivoted arm to press the lever upon either side of its fulcrum, a spring acting upon said pivoted arm to hold it against the lever, a trip-lever adapted to shift said arm, a flexible connection between the trip-lever and the bellows, whereby the movements of the bellows alternately operate the valves, and an adjustable striker to control the time of action of said trip-lever carried by the bellows.

7. The combination of a bellows, pipes to admit gas to and from the bellows, a registering device operated by the bellows, valves for gas inlet and outlet, a pivoted valve-lever connecting said valves, so as to open one simultaneously with the closing of the other, and vice versa, a pivoted arm to press on the lever upon either side of its fulcrum, a spring acting on the valve-lever to hold it in one of its extreme tilted positions, and a trip device actuated by the bellows for operating said valve-lever.

8. In a meter, the combination of the chamber A, having the interior bellows, E, inlet-pipe F, having ports $h$, outlet-pipe F′, having ports $h'$, valves G and $g$ for the inlet-pipe, connected together, valves G′ $g'$ for the outlet-pipe, connected together, a connecting valve-lever, K, for operating said valves, a trip mechanism, substantially as shown, for rocking said valve-lever, a chain-connection, R, carried by the bellows for actuating the trip mechanism, and a registering mechanism operated by movements of the bellows.

JOSEPH J. HARRELL.

Witnesses:
W. A. COVENTRY,
JOSEPH SWESEY.